United States Patent [19]
Hochwitz et al.

[11] 4,433,868
[45] Feb. 28, 1984

[54] CAB FOR WALK-BEHIND TRACTOR

[75] Inventors: Lynn E. Hochwitz, Sheboygan Falls; Daniel W. Schaefer, Port Washington; Michael L. Dawson, West Bend, all of Wis.

[73] Assignee: Simplicity Manufacturing, Inc., Port Washington, Wis.

[21] Appl. No.: 336,330

[22] Filed: Dec. 31, 1981

[51] Int. Cl.³ .............................................. B62D 39/00
[52] U.S. Cl. .................................. 296/190; 180/89.12; 296/102
[58] Field of Search ...................... 296/102, 190, 78 R, 296/78.1, 79, 80; 180/89.12

[56] References Cited

U.S. PATENT DOCUMENTS

| 2,481,868 | 9/1949 | Philip | 296/210 |
|---|---|---|---|
| 2,667,379 | 1/1954 | Baze | 296/102 |
| 3,333,888 | 8/1967 | Williams et al. | 296/102 |
| 3,341,247 | 9/1967 | Martinmaas | 296/190 |
| 3,709,553 | 1/1973 | Churchill et al. | 296/78 R |
| 4,089,556 | 5/1978 | Stobar | 296/78.1 |
| 4,278,285 | 7/1981 | Cummings et al. | 296/78.1 |

FOREIGN PATENT DOCUMENTS

| 540386 | 12/1931 | Fed. Rep. of Germany | 296/78.1 |
|---|---|---|---|
| 2008557 | 9/1971 | Fed. Rep. of Germany | 296/190 |
| 1530465 | 6/1968 | France | 292/210 |
| 96611 | 8/1960 | Norway | 296/102 |

Primary Examiner—Joseph F. Peters, Jr.
Assistant Examiner—Ross Weaver
Attorney, Agent, or Firm—James E. Nilles

[57] ABSTRACT

A protective cab (31) for the operator of a walk-behind tractor such as a snowthrower (11) is enclosed on its front and lateral sides by large window panels (51, 52, 53) of transparent plastic material extending between a top (32) and a bottom shroud (101). A pair of frames (56, 57) interconnect the top (32), the panels (51, 52, 53) and the shroud (101) and together with a pair of braces (121, 122) connect the cab to the handlebars (17, 18) and handlebar support (16). A transverse trough (34) minimizes flow of water over the rear edge of the roof (32) thus enhancing the comfort of the operator. The shroud (101) protects the operator against upwardly swirling winds and provides pocket means useful for temporarily storing personal items.

7 Claims, 4 Drawing Figures

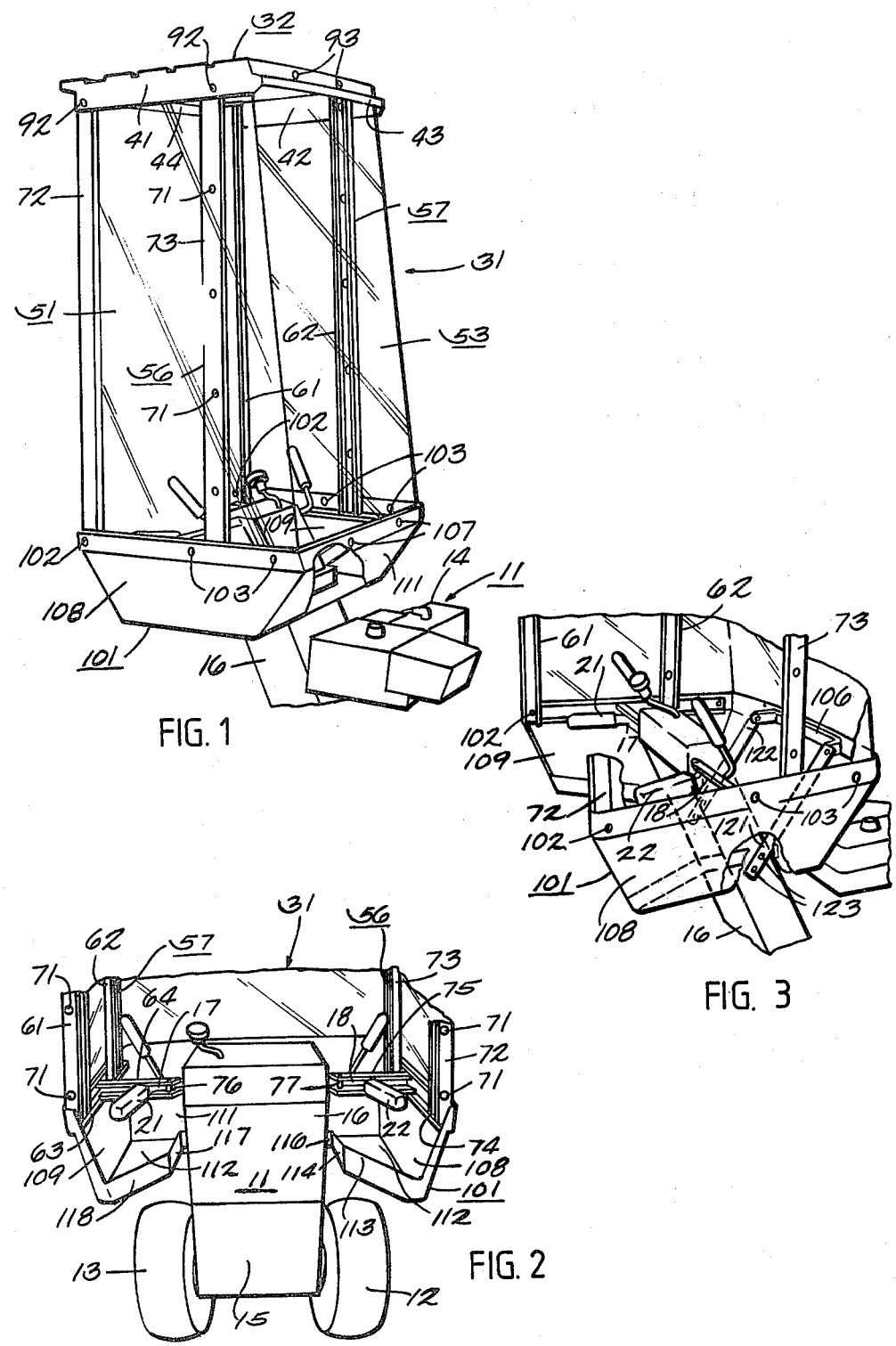

CAB FOR WALK-BEHIND TRACTOR

BACKGROUND OF THE INVENTION

1. Technical Field

This invention relates to a protective cab for the operator of a walk-behind tractor, such as a snowthrower.

2. Prior Art

Heretofore others have suggested cabs for walk-behind tractors and the like. One such cab is shown in U.S. Pat. No. 3,333,888, wherein a partial enclosure for the operator of a walk-behind tractor includes transparent windows in a fabric cover draped over a skeleton frame releasably secured to the handlebars and the handlebar supports extending rearwardly from the walk-behind tractor. In U.S. Pat. No. 3,709,553 flexible transparent plastic curtains encompass the passenger compartment of a motorized golf cart. A transparent plastic tractor cab is shown in U.S. Pat. No. 2,667,379.

BRIEF DESCRIPTION OF THE INVENTION

The primary object of our invention is to provide a protective enclosure for the walking operator of a walk-behind tractor, such as an engine-driven snowthrower, which will protect the operator from adverse weather conditions such as high velocity winds and wind blown snow. In order to provide an excellent field of vision, we provide transparent side and front walls in the cab avoiding placement of posts at the front corners. The transparent walls extend from the top or roof to the level of the handlebars thus affording the operator the opportunity to clearly observe the operation of the snowthrower and the surrounding area. We provide a transverse waterway at the upper rear of cab top to drain any water deposited thereon, or resulting from melting snow, laterally from the top. This prevents water from running off the rear of the top onto the back of the operator. A shroud is provided at the lower end of the cab which serves to greatly diminish air currents which would otherwise swirl or blow upwardly into the cab area, which in the case of a snow throwing operation would tend to carry air entrained snow. The shroud is shaped to provide a pocket at each side in which the operator may conveniently place small personal items, such as sunglasses, gloves, hand tools, or the like. The cab includes a pair of frames at each side to which transparent wall panels and the top are attached, each frame having a pair of upright front and rear posts connected at their bottoms to a longitudinal frame member to which a handlebar attaching bracket is secured. The cab is further stabilized on the tractor by a pair of braces extending downwardly and rearwardly from the lower front edge of the front transparent wall to the support for the handlebars to which they are attached by suitable releasable fastening means.

BRIEF DESCRIPTION OF THE DRAWINGS

An embodiment of the present invention is illustrated in the drawings in which:

FIG. 1 is a partial pictorial view of a walk-behind snowthrower with a protective cab installed thereon;

FIG. 2 is a rear view of the structure shown in FIG. 1 with the upper part of the protective cab broken away;

FIG. 3 is a partial pictorial view of the cab and snowthrower shown in FIGS. 1 and 2.

DETAILED DESCRIPTION OF THE DRAWINGS

Figure 4:
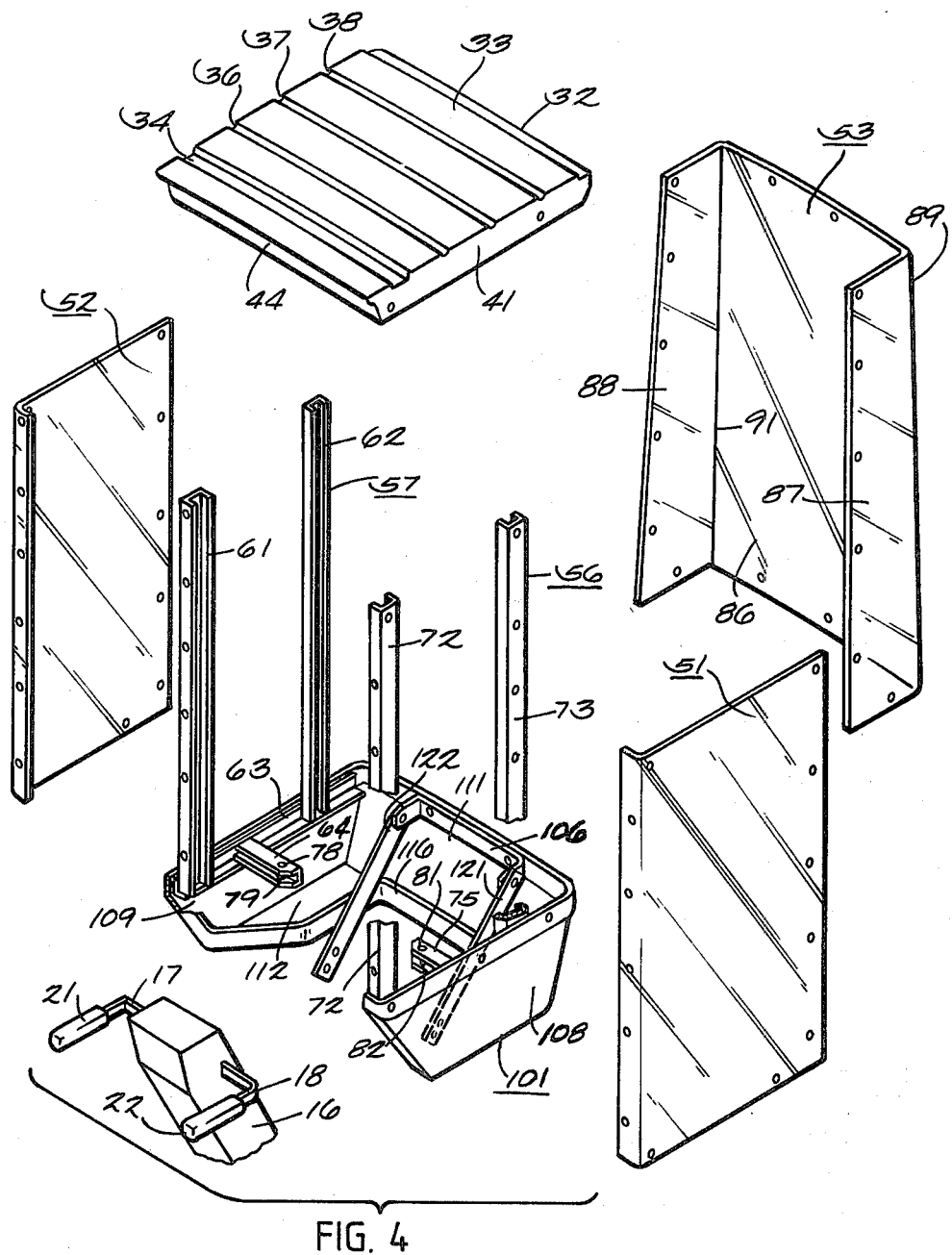
FIG. 4 is an exploded view of the protective cab disconnected from the walk-behind snowthrower.

Referring to the drawings, the partly shown snowthrower 11 includes a pair of drive wheels 12, 13 mounted on the main frame 15 of the snowthrower on a transverse axis. The wheels 12, 13 are driven by an engine 14 mounted on the main frame 15. A handle structure includes a handlebar support 16 secured to and extending upwardly and rearwardly from the main frame 15 and a pair of handlebars 17, 18 rigidly secured to and extending laterally outward from opposite sides of the handlebar support 16. The handlebars 17, 18 include rearwardly extending hand grips 21, 22.

An operator's cab 31 is constructed as a removable attachment for a walk-behind tractor such as the snowthrower 11. The cab 31 includes a generally flat roof or top 32 having a top wall 33 with transverse wall means forming a plurality of transverse grooves or recesses 34, 36, 37, 38 which not only serve to make the top somewhat stiffer but also divert or convey the water from melting snow to the lateral sides of the cab so as to prevent it running over the rear of the top and down the back of an operator. It will be noted that the trough formed by recess 34 is somewhat larger than the other recesses. The recesses 34, 36, 37, 38 also help prevent snow from sliding rearwardly off the top as the operator maneuvers the two wheel vehicle. The top 32 includes a pair of laterally spaced, downwardly extending sidewalls or edges 41, 42, a downwardly extending front wall or edge 43 and a downwardly extending rear wall or edge 44. The edges 41, 42, 43, 44 increase the strength and rigidity of the top 33 and are secured to the upper ends of three transparent plastic panels 51, 52, 53 which in their installed condition form a pair of laterally spaced side walls and a front wall for the cab 31.

A pair of frames 56, 57, which are reverse images of one another, are provided at laterally opposite sides of the cab. Frame 57 includes a pair of upright channels or posts 61, 62 rigidly secured at their lower ends, as by welding, to rear and intermediate parts, respectively, of a longitudinal frame member in the form of an angle 63 which extends horizontally along the lower end of the side wall and is secured thereto by appropriate fastening means, such as rivets 102, 103. The frame 57 also includes a handlebar attaching bracket, in the form of a laterally inward extending horizontal channel 64, secured as by welding at its laterally outer end to the angle 63 at a point between the rear and front upright posts 61, 62.

The frame 56 includes rear and front posts 72, 73, a longitudinal frame member 74 and a handlebar attaching bracket 75. As shown in FIG. 2, the laterally extending portions of the handlebars 17, 18 fit between the upper and lower flanges of the channels 64, 75 and are held in place by pins 76, 77 extending respectively through vertically aligned pairs of openings 78, 79 and 81, 82 in the channel flanges. It will be noted that the front panel 53 includes a front wall part 86 and a pair of side wall parts 87, 88 which extend rearwardly from the laterally opposite edges of the front wall part 86. The front panel may be formed by bending a flat sheet of transparent plastic which has been heated where the bending takes place. The upper ends of the window panels 51, 52, 53 are connected to the side edges 41, 42 and front edge 43 of the top 32 by rivets 92, 93 with rivets 92 also securing the side panels 51, 52 and top 32 to the posts 61, 62, 72, 73. The upper ends of the panels 51, 52, 53 are above the eye level of a standing operator. The side walls 87, 88 overlap the front portions of the side panels 51, 52 and have aligned openings for receiving rivets 71 which also pass through openings in the posts 62, 73.

A shroud 101 is provided at the bottom of the cab 31 to protect the operator from upwardly swirling winds, which otherwise during a snow removal operation on a windy day would blow snow into the cab and thus subject the operator to discomfort. The shroud 101 has upper side edges secured by rivets 102, 103 to angles 63, 74. The rivets 102 extend through aligned openings in the shroud 101, one of the side panels 51, 52, one of the angles 63, 74 and one of the posts 72, 61. The rivets 103 extend through aligned openings in the shroud 101, one of the side panels 51, 52 and one of the angles 63, 74. The shroud 101 has side walls 108, 109 and a front wall 111 which extend downwardly and inwardly toward the handlebar support 16, a horizontal bottom wall 112 integrally connected to the bottom ends of the walls 108, 109, 111 and extending inwardly toward the handlebar support 16 and upstanding wall segments 113, 114, 116, 117, 118 extending upward a short distance from the rear and inner edges of the bottom wall 112 to form an upwardly open U-shaped utility pocket at the front and laterally opposite sides of the handle structure 16 for receiving personal articles the operator might wish to temporarily place there, such as hand tools, eye glasses, gloves, muffler, hat, etc. The bottom wall 112 terminates at its inner edges adjacent to the handlebar support 16 so as to complete, with the side and front walls 108, 109, 111, an effective barrier to upwardly swirling air currents which during a snow removal operation would most likely be carrying snow particles. A pair of braces 121, 122 extend downwardly and rearwardly from pivot connections with rearwardly extending and laterally spaced flanges of the brackets 106 to position abutting the laterally outer sides of the handlebar support 16 to which their lower ends are releasably secured by cap screws 123.

The cab 32 provided for walk-behind tractors or the like not only provides protection for the operator from inclement weather and blowing snow but also shields the operator from cold winds thus reducing the loss of body heat. The bottom shroud 101 contributes in this desirable result by acting as an updraft shield. The shroud surrounds the support and attaching structure (brackets 64, 75 and braces 121, 122) to provide a pleasing appearance and front and lateral pocket areas. The discomfort of having water run down the back of the operator's neck is minimized by the transverse wall means in the form of the groove 34 to divert water laterally from the top 32.

The wrap-around corners 89, 91 on the front panels 53 and the great vertical dimension of all three panels 51, 52, 53 provide ideal, unencumbered line of sight for the operator to observe not only the operation of the snowthrower, but also the adjacent terrain.

The embodiments of the invention in which an exclusive property or privilege is claimed are defined as follows:

1. A cab for a walk-behind tractor that has a substantially upright handlebar support from the top of which handlebars project rearwardly and to opposite sides, said cab being characterized by:
A. A shroud member having
   (1) a substantially U-shaped bottom wall with
      (a) a front portion which can extend laterally across the handlebar support in front of the same and
      (b) opposite side portions that project rearward from said front portion to be disposed at opposite sides of the handlebar support,
   (2) a front wall projecting upward from the front edge of said front portion of the bottom wall, and
   (3) a pair of opposite upwardly projecting side walls, each extending rearward from an end of said front wall and all along an outer edge of one of said side portions of the bottom wall;
B. A pair of elongated clamping members, each projecting laterally inwardly from one of said side walls and each having clamping means at an inner end thereof for securement to one of the handlebars;
C. A pair of elongated brace legs, each having a first connection at an upper end thereof to said front wall and projecting obliquely rearward and downward therefrom to have a second connection at its other end to the handlebar support, said legs being laterally spaced apart to have their said second connections at opposite sides of the handlebar support;
D. A pair of transparent side panels, each connected near a lower edge thereof with one of said side walls of the shroud member and projecting upward therefrom;
E. A transparent front panel connected near a lower edge thereof with said front wall of the shroud member; and
F. A top having
   (1) a downwardly projecting front edge connected with an upper edge portion of said front panel, and
   (2) a pair of opposite downwardly projecting side edges, each connected with an upper edge of one of said side panels.

2. The cab of claim 1, further characterized by:
G. Said front panel having a pair of rearwardly projecting side portions, each having a rear edge which is connected with a front edge of one of said side panels.

3. The cab of claim 2, further characterized by:
H. A rigid horizontally elongated frame member extending along each of said side walls and secured thereto, and to each of which one of said clamping members is secured at the outer end thereof;
I. A pair of upright frame members projecting up from each said horizontally elongated frame member and secured thereto,
   (1) one of said upright frame members being near the rear end of the adjacent side wall and having the rear edge of the adjacent side panel secured thereto, and (2) the other of said upright frame members being spaced a distance forwardly from said one upright frame member and having the rear edge of its adjacent side portion of the front panel and the front edge of its side panel secured to it.

4. The cab of claim 1, further characterized by:
said shroud member having wall segments projecting upwardly from its bottom wall, around the rear and inner edges of its side portions and the rear edge of its front portion to cooperate with said bottom wall, front wall and side walls in defining an upwardly opening U-shaped receptacle.

5. The cab of claim 1, further characterized by:
said top being substantially flat but having upwardly opening grooves extending from said to side across it, at intervals between its front and rear edges, to serve as stiffeners and as gutters that divert snow and water laterally.

6. The cab of claim 5, further characterized by:
one of said gutters being near the rear edge of said top.

7. The cab of claim 1, further characterized by:
said first connection of each of said elongated brace legs comprising bracket means secured to said front wall of the shroud member, to which each of said brace legs has a pivotal connection at its upper end.

* * * * *